(12) United States Patent
Santobianco et al.

(10) Patent No.: US 6,774,193 B2
(45) Date of Patent: Aug. 10, 2004

(54) STABILIZED UNSATURATED POLYMER RESIN COMPOSITIONS AND METHODS OF USING THE SAME

(75) Inventors: John Gabriel Santobianco, Ocean Springs, MS (US); Robson F. Storey, Hattiesburg, MS (US); Rajamani Nagarajan, Ocean Springs, MS (US)

(73) Assignees: Albemarle Corporation, Baton Rouge, LA (US); The University of Southern Mississippi, Hattiesburg, MS (US)

(*) Notice: Subject to any disclaimer, the term of this patent is extended or adjusted under 35 U.S.C. 154(b) by 0 days.

(21) Appl. No.: 10/196,798

(22) Filed: Jul. 17, 2002

(65) Prior Publication Data

US 2003/0083443 A1 May 1, 2003

Related U.S. Application Data

(63) Continuation of application No. 09/593,799, filed on Jun. 14, 2000, now abandoned.

(51) Int. Cl.[7] .................. C08G 59/14; C08L 63/10; C08K 5/18; C08K 5/17
(52) U.S. Cl. ............... 525/531; 525/25; 525/35; 525/374; 525/379; 525/380; 525/922; 523/461; 523/500; 523/508; 523/514
(58) Field of Search .................. 525/25, 35, 374, 525/379, 380, 922, 531; 523/500, 514, 461, 508

(56) References Cited

U.S. PATENT DOCUMENTS

| | | |
|---|---|---|
| 2,659,719 A | 11/1953 | Dickey et al. |
| 3,256,226 A | 6/1966 | Fekete et al. |
| 3,367,994 A | 2/1968 | Parker et al. |
| 3,914,200 A | 10/1975 | Oswitch et al. |
| 3,950,287 A | 4/1976 | Coats et al. |
| 4,012,542 A | 3/1977 | Oswitch et al. |
| 4,083,890 A | 4/1978 | Drake et al. |
| 4,219,626 A | 8/1980 | Wolfers et al. |
| RE30,583 E | 4/1981 | Nelson |
| 4,267,279 A | 5/1981 | Howell |
| 4,309,511 A * | 1/1982 | Jefferson et al. ............... 525/14 |
| 4,421,879 A | 12/1983 | Eimers et al. |
| 4,594,398 A | 6/1986 | Nelson et al. |
| 4,666,978 A | 5/1987 | Storey et al. |
| 4,931,514 A | 6/1990 | Waters |
| 5,326,795 A | 7/1994 | Wykowski |
| 5,378,743 A | 1/1995 | Liedtke |
| 5,861,466 A | 1/1999 | Hartinger |
| 6,114,470 A | 9/2000 | Santobianco et al. |
| 6,221,935 B1 | 4/2001 | Hashimoto et al. |
| 6,258,894 B1 | 7/2001 | Santobianco et al. |

FOREIGN PATENT DOCUMENTS

| | | |
|---|---|---|
| EP | 0 074 564 | 3/1983 |
| GB | 1 228 452 | 4/1971 |
| GB | 1 415 059 | 11/1975 |
| GB | 1 415 060 | 11/1975 |
| GB | 1 476 368 | 6/1977 |
| GB | 1 540 228 | 2/1979 |
| JP | 56-166270 | 12/1981 |

OTHER PUBLICATIONS

Bent, R. L. et al., "Chemical Constitution, Electrochemical, Photographic, and Allergenic Properties of p–amino–N, N–dialkylanilines," *J. Am. Chem. Soc.*, vol. 73, pp. 3100–3125, 1951.

Demmler, K. et al., "Cold Curing of Unsaturated Polyester Resins with the System Benzoyl Peroxide/Tertiary Aromatic Amine," *Chemical Abstracts*, Nov. 18, 1974, vol. 81(20), Abstract No. 121658 (XP002035575), see abstract and Kunststoffe, vol. 64(2), pp. 78–76, 1974.

Dnebosky, J. et al., "Polymerizable Amines as Promoters of Cold–Curing Resins and Composities," *J. Dent. Res.*, vol. 54(4), pp. 772–776, 1975.

Lattes, A. et al., "Reactions of Glycol Monochlorohydrin with Some Amines," *Bull Soc. Chim. France*, vol. 7, pp. 2037–2043, 1965.

Qiu, K. et al., "The Effects of N–2–hydroxyethyl–N–methyl–p–toluidine on Methyl Methacrylate Radical Polymerization and Acrylonitrile Photoinduced Polymerization," *Chin. J. Polym. Sci.*, vol. 10(3), pp. 250–257, 1992.

Storey, R. F. et al., "Improved Room–Temperature Cure of Unsaturated Polyester Resins," *Modern Plastics*, Dec. 1984.

Teplov, N. E. et al., "Synthesis of O,O–diethyl S–β–(Arylmethylamino)ethyl Phosphorothiolates and Their Methyl Methosulfates," pp. 1680–1684, Institute of Hetero–organic Compounds of the USSR Academy of Science, translated from *Zhurnal Organicheskoi Khimii*, vol. 1(9), pp. 1658–1662, Sep. 1965.

Werts, A. et al., "Cure Promoters for Trimethylpentanediol Based Unsaturated Polyesters," *Chemical Abstracts*, Oct. 20, 1969, vol. 71(16), Abstract No. 71466 (XP002035516), see abstract and U.S. Pat. Off., Offic. Gaz., vol. 864(3), p. 731 (US 790857), 1969.

Dow Plastics Product Brochure entitled "DERAKANE™—Epoxy Vinyl Ester Resins—Chemical Resistance and Engineering Guide," 1993.

* cited by examiner

*Primary Examiner*—Jeffrey B. Robertson
(74) *Attorney, Agent, or Firm*—Alston & Bird LLP (57) ABSTRACT

Stabilized pre-promoted unsaturated polymer resin systems that include a tertiary aromatic amine cure promoter. The stabilized curable resins systems can include a vinyl ester resin.

65 Claims, 2 Drawing Sheets

Figure 1. Gel time as a function of shelf aging. Samples stored under nitrogen.

Figure 2. Cure time as a function of shelf aging. Samples stored under nitrogen.

Figure 3. Gel time as a function of shelf aging. Samples stored under air.

Figure 4. Cure time as a function of shelf aging. Samples stored under air.

STABILIZED UNSATURATED POLYMER RESIN COMPOSITIONS AND METHODS OF USING THE SAME

CROSS REFERENCE TO RELATED APPLICATIONS

This application is a continuation of copending U.S. application Ser. No. 09/593,799, filed Jun. 14, 2000, now abandoned which is incorporated by reference herein in its entirety.

FIELD OF THE INVENTION

The present invention relates to unsaturated polymer resin compositions and more particularly to stabilized unsaturated polymer resin compositions which include a cure promoter agent and methods of using the same.

BACKGROUND OF THE INVENTION

Vinyl ester resins exhibit several desirable properties, including superior chemical resistance and excellent electrical and thermal-insulation properties. Such resins are industrially important in the manufacture of reinforced plastic components, boat hulls, fireproof molded articles, linings, paints, coating compositions, tanks, vessels, scrubbers, smoke stacks, pipe linings and other composite materials. These resins are generally prepared and mixed with a polymerizable monomer such as styrene, in order to reduce their viscosity. When cured, the styrene becomes a part of the resin system to produce a rigid cross-linked structure with desirable properties.

Tertiary aromatic amines are widely used as cure promoters or accelerators for unsaturated resins, including vinyl ester reins, in the presence of peroxide initiators. Exemplary tertiary amines useful as cure promoters include, for example, N,N-dimethylaniline (DMA), N,N-diethylaniline (DEA), N,N-bis-(2-hydroxyethyl)-m-toluidine, N,N-bis-(2-hydroxyethyl)-p-toluidine (HEPT), and N,N-dimethyl-p-toluidine (DMPT).

Some unsaturated polymer resin systems can be pre-formulated with the cure promoter or accelerator to yield a "pre-promoted" resin system. A common problem encountered with pre-promoted systems, however, is a decrease in storage stability or shelf life. The reaction times for gelling and subsequent curing of these systems tend to drift over a period of time, a phenomenon referred to as "gel-time drift." The variations in gel time are typically measured as the difference between a gel-time after a period of storage and a gel-time just after formulation of the resin system. Usually, storing pre-promoted unsaturated polymer resin systems, particularly vinyl ester resin systems, for long periods results in longer gel or curing times. Such variations are problematic, particularly for applications requiring predictability of gel-time.

SUMMARY OF THE INVENTION

The present invention is directed to curable, pre-promoted unsaturated polymer resin systems that exhibit improved shelf stability and reduced gel-time drift. The pre-promoted systems of the invention generally include an unsaturated polymer resin, such as a vinyl ester resin, and a cure promoter capable of increasing storage stability or shelf life and also reducing or minimizing gel-drift thereof. Further, the pre-promoted systems exhibit improved shelf stability without an unduly adverse effect on cure rates. That is, the cure promoters can provide the apparent contradictory properties of improved storage stability with minimized gel-time drift coupled with fast cure speeds. Further, the promoters can provide fast cure rates at room temperature, and below.

The cure promoter can be a tertiary aromatic amine of the formula (I):

wherein:
each A is independently selected from the group consisting of linear or branched C1 to C20, preferably C1 to C6, alkyl; C3 to C20, preferably C3 to C6, cycloalkyl; and functionalized linear or branched C1 to C20 alkyl comprising a heteroatom, with the proviso that both As are not linear or branched C1 to C20 alkyl; and $R_5$, $R_6$, $R_7$, $R_8$, and $R_9$ are each independently selected from the group consisting of H, linear or branched C1 to C20, preferably C1 to C6, alkyl, C3 to C20, preferably C3 to C6, cycloalkyl, and C1 to C20, preferably C1 to C6, alkoxy.

In various advantageous embodiments of the invention, at least one A can be functionalized linear or branched C1 to C20 alkyl comprising a heteroatom. In one aspect of this embodiment of the invention, at least one A can be linear or branched C1 to C20, preferably C1 to C6, alkyl or C3 to C20, preferably C1 to C6, cycloalkyl, and the other A can be functionalized linear or branched C1 to C20 alkyl comprising a heteroatom. In yet another aspect of this embodiment of the invention, both As can be functionalized linear or branched C1 to C20 alkyl comprising a heteroatom.

In yet another advantageous embodiment of the invention, at least one A is:

wherein:
$R_2$ is H, linear or branched C1 to C20, preferably C1 to C6, alkyl, or C3 to C20, preferably C3 to C6, cycloalkyl, wherein said C1 to C20 alkyl or C3 to C20 cycloalkyl is optionally substituted at the C1 or C3 position, respectively, by X as defined below;

$R_3$ and $R_4$ are each independently selected from the group consisting of H, linear or branched C1 to C20, preferably C1 to C6, alkyl, and C3 to C20, preferably C3 to C6, cycloalkyl; and

X is OH, $OR_1$, CN, $OC(O)R_1$, $O[(CH_2)_mO]_nH$, $O[(CH_2)_mO]_nR_1$, $[(CH_2)_m O]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl. In one particularly advantageous aspect of the invention, the other A can be methyl and $R_7$ can be linear or branched C1 to C6 alkyl, C3 to C6 cycloalkyl or C1 to C6 alkoxy.

Alternatively, in this aspect of the invention, each A can be wherein $R_2$, $R_3$, $R_4$, and X are each as defined above.

In currently preferred embodiments of the invention, the cure promoter can be a tertiary aromatic amine of the formula (II):

wherein:

$R_1$ is linear or branched C1 to C6 alkyl or C3 to C6 cycloalkyl;

$R_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;

$R_3$ and $R_4$ are each independently selected from the group consisting of H, linear or branched C1 to C6 alkyl, and C3 to C6 cycloalkyl;

$R_5$, $R_6$, $R_7$, $R_8$, and $R_9$ are each independently selected from the group consisting of H, linear or branched C1 to C6 alkyl, C3 to C6 cycloalkyl, and C1 to C6 alkoxy; and X is OH, $OR_1$, CN, $OC(O)R_1$, $O[(CH_2)_mO]_nH$, $O[(CH_2)_mO]_nR_1$, $[(CH_2)_m]_nH$, $[(CH_2)_mO]_nR_1$, or $NC(O)R_1$, wherein at least one H of each $(CH_2)_m$ group can be optionally substituted with straight chain or branched C1—C20 alkyl, m=1 to 6, n=1 to 6, and each $R_1$ is independently linear or branched C1 to C18 alkyl or C3 to C18 cycloalkyl.

Particularly preferred are compounds of the following formula wherein $R_2$ is H, linear or branched C1 to C6 alkyl, or C3 to C6 cycloalkyl, wherein said C1 to C6 or C3 to C6 cycloalkyl is optionally substituted at the C1 or C3 position, respectively, by X as defined below;

$R_3$ and $R_4$ are each independently selected from the group consisting of H, linear or branched C1 to C6 alkyl, C3 to C6 cycloalkyl, and C1 to C6 alkoxy;

$R_7$ is linear or branched C1 to C6 alkyl, C3 to C6 cycloalkyl or C1 to C6 alkoxy; and X is OH, $O[(CH_2)_mO]_nH$, or $[(CH_2)_mO]_nH$, wherein at least one H of each $(CH_2)_m$ group can be optionally substituted with straight chain or branched C1–C6 alkyl, m=2, and n=1 to 6.

The cure promoters of Formula (I), alone, in mixtures with one another, or in mixtures with other cure promoters, are particularly advantages for use with vinyl ester resins. Vinyl ester resins typically are not pre-promoted, due to the gel-time drift of such systems in the presence of conventional cure or accelerating promoters such as metal salts, e.g. cobalt naphthenate, N,N-dimethyl aniline, or N,N-dimethyl-p-toluidine.

The compound of Formula (I) may be added to the unsaturated polymer resin system between steps of formulation of the resin system or after all formulation steps are completed. Generally the compound of Formula (I) is added to the unsaturated polymer resin system in an amount effective to provide a promoted unsaturated polymer resin system having a gel-time drift which is lower than the gel-time drift of a counterpart unsaturated polymer resin with a promoter system lacking the compound of Formula (I).

The compound of Formula I may be added to restore the activity of a resin system which has been pre-promoted with conventional promoters and has already undergone gel-time drift. Gel times will then exhibit reduced drift from their restored activity. By comparison, adding conventional promoter will restore activity, but gel times will again drift.

The present invention also provides compositions that include the cure promoter of Formula (I) with the unsaturated polymer resin and a cure initiator, as well as processes for using the same.

BRIEF DESCRIPTION OF THE DRAWINGS

Some of the features and advantages of the invention having been stated, others will become apparent from the detailed description which follows, and the accompanying drawings which form a part of the original disclosure of this invention, and in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention relates to stabilized pre-promoted resin compositions comprising: (1) an unsaturated polymer resin system, such as a vinyl ester resin system; and (2) a cure promoter capable of improving the shelf life of the unsaturated polymer resin.

The cure promoters include tertiary aromatic amines of the formula (I):

(I)

wherein:
each A is independently selected from the group consisting of linear or branched C1 to C20, preferably C1 to C6, alkyl; C3 to C20, preferably C3 to C6, cycloalkyl; and functionalized linear or branched C1 to C20 alkyl comprising a heteroatom, with the proviso that both As are not linear or branched C 1 to C20 alkyl; and
$R_5$, $R_6$, $R_7$, $R_8$, and $R_9$ are each independently selected from the group consisting of H, linear or branched C1 to C20, preferably C1 to C6, alkyl, C3 to C20, preferably C3 to C6, cycloalkyl, and C1 to C20, preferably C1 to C6, alkoxy.

The heteroatom can be, for example, one or more oxygen, nitrogen, sulfur, or halogen atoms. Preferred halogen atoms are chlorine and bromine. Compounds having one or more bromine atoms incorporated thereon can advantageously impart flame resistance benefits to the end product.

In various advantageous embodiments of the invention, at least one A can be functionalized linear or branched C1 to C20 alkyl comprising a heteroatom. In one aspect of this embodiment of the invention, at least one A can be linear or branched C1 to C6 alkyl or C3 to C6 cycloalkyl, and the other A can be functionalized linear or branched C1 to C20 alkyl comprising a heteroatom. In yet another aspect of this embodiment of the invention, both As can be functionalized linear or branched C1 to C20 alkyl comprising a heteroatom.

In yet another advantageous embodiment of the invention, at least one A is:

wherein:
$R_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;
$R_3$ and $R_4$ are each independently selected from the group consisting of H, linear or branched C1 to C6 alkyl, and C3 to C6 cycloalkyl; and
X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, m=1 to 6, n=1 to 6, and each $R_1$ is independently linear or branched C1 to C18 alkyl or C3 to C18 cycloalkyl.
In this aspect of the invention, one or more hydrogen atoms in the $(CH_2)_m$ alkylene group can be replaced with substituted with straight chain or branched C1–C20, preferably C1 to C6, alkyl. For example, the alkylene group can include a methyl branch as exemplified by the repeating alkylene unit propyleneoxy $[CH_2—CH(CH_3)—O]_n$. Also in this aspect of the invention, X can be derived, for example, from fatty acids and derivatives thereof, such as fatty acid amides. As known in the art, fatty acids are generally described as carboxylic acids which contain a chain of alkyl groups and characterized by the terminal carboxyl group —COOH. The —OH group can be substituted with an amine group to form a fatty acid amide. Thus, for example and without limitation, the compounds of the invention can include alkyl chains derived from butyric, lauric, palmitic and stearic fatty acids, and derivatives thereof, including fatty acid amide derivatives.

Alternatively, in this aspect of the invention, each A can be wherein $R_2$, $R_3$, $R_4$, and X are each as defined above.

In currently preferred embodiments of the invention, the cure promoters include tertiary aromatic amines of the formula (II):

(II)

wherein:
$R_1$ is linear or branched C1 to C6 alkyl or C3 to C6 cycloalkyl;
$R_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;
$R_3$ and $R_4$ are each independently selected from the group consisting of H, linear or branched C1 to C6 alkyl, and C3 to C6 cycloalkyl;
$R_5$, $R_6$, $R_7$, $R_8$, and $R_9$ are each independently selected from the group consisting of H, linear or branched C1 to C6 alkyl, C3 to C6 cycloalkyl, and C1 to C6 alkoxy; and
X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl.

Currently preferred are compounds of Formula (I) wherein:
$R_1$ is methyl or ethyl;
$R_2$ is H or hydroxymethyl;
$R_3$ or $R_4$ are each independently selected from the group consisting of H, methyl and ethyl;
$R_5$, $R_6$, $R_7$, $R_8$, and $R_9$ are each independently selected from the group consisting of H and methyl; and X is OH, O[(CH$_2$)$_m$O]$_n$H, or [(CH$_2$)$_m$O]$_n$H, wherein at least one H of each (CH$_2$)$_m$ group can be optionally substituted with straight chain or branched C1–C6 alkyl, m=2, and n=1 to 6.

Particularly preferred are compounds of the following formula wherein:
R$_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;

R$_3$ and R$_4$ are each independently selected from the group consisting of H, linear or branched C1 to C6 alkyl, and C3 to C6 cycloalkyl;

R$_5$, R$_6$, R$_8$, and R$_9$ are each independently selected from the group consisting of H, linear or branched C1 to C6 alkyl, C3 to C6 cycloalkyl, and C1 to C6 alkoxy;

R$_7$ is linear or branched C1 to C6 alkyl, C3 to C6 cycloalkyl or C1 to C6 alkoxy; and X is OH, O[(CH$_2$)$_m$O]$_n$H, or [(CH$_2$)$_m$O]$_n$H, wherein at least one H of each (CH$_2$)$_m$ group can be optionally substituted with straight chain or branched C1–C6 alkyl, m=2, and n=1 to 6.

The preferred promoters useful in the present invention provide not only reduced gel-time drift but also enhanced activity, that is relatively fast gel and cure times. The preferred promoters include an activating group (R$_7$) para to the nitrogen atom of the amino group. Although not wishing to be bound by any explanation of the invention, this activating group is believed to increase the electron density of the nitrogen, thus increasing the rate of radical formation and cure speed. Additionally, the nitrogen of the preferred promoters is substituted with a methyl group. It is believed that the methyl group minimizes steric hindrance around the nitrogen, thereby increasing the rate of radical formation and improving cure speed. Further, the preferred promoters of the present invention include an activating group (X) on the aliphatic carbon beta to the nitrogen. It is believed that this activating group increases the electron density at the amino nitrogen, thereby also increasing the rate of radical formation and resulting cure speed. The above combination of features can provide increased gel and cure rates, as well as better performance over a wider temperature range with minimal gel-time drift.

As used herein, the term "C1 to C20 alkyl" refers to C1 to C20 linear or branched alkyl, such as methyl, ethyl, propyl, butyl, isopropyl, sec-butyl, and tert-butyl, butyl, pentyl, isopentyl, and hexyl. The term "C1 to C20 cycloalkyl" as used herein refers to C3 to C20 cyclic alkyl, such as cyclopropyl, cyclobutyl, cyclopentyl, and cyclohexyl. The term "C1 to C20 alkoxy" as used herein refers to C1 to C20 linear or branched oxygen-substituted alkyl, such as methoxy, ethoxy, propyloxy, butyloxy, isopropyloxy, and t-butyloxy.

Exemplary preferred compounds of Formula (I) in accordance with the invention include, but are not limited to, N-methyl-N-(2-hydroxyethyl)-p-toluidine (MHPT); N-ethyl-N-(2-hydroxyethyl)-p-toluidine (EHPT); and N-methyl-N-(2-hydroxypropyl)-p-toluidine (2HPMT). Other compounds of Formula (I) include N-(2-hydroxyethyl)-N-methyl aniline, N-(2-hydroxyethyl)-N-ethyl aniline, N,N-bis-(2-hydroxyethyl)-m-toluidine, N-(2-hydroxyethyl)-N-[2-(2-hydroxyethoxy) ethylaniline, N,N-bis-(2-hydroxyethyl)-p-toluidine (HEPT), N-(8-hydroxy-3,6-dioxooctyl)-N-methyl-p-toluidine, N-(8-hydroxy-1,4,7-trimethyl-3,6-dioxooctyl)-N-methyl-p-toluidine, N-(2-hydroxyethyl)-N-tribromomethy-p-toluidine, and N-(1,1-dibromo-2-hydroxyethyl)-N-methyl-p-toluidine.

The compounds of Formula (I) used in accordance with the method of the invention can be used in quantities between about 0.0001 and about 20 percent by weight, preferably in quantities between about 0.001 and about 15 percent by weight, and more preferably between about 0.01 and 8 percent by weight, based on weight of the unsaturated resin.

The compounds used in accordance with the invention can be used individually. However, mixtures of the cure promoters of Formula (I) as well as mixtures of these compounds with other cure promoters, such as other tertiary aromatic amines, metal salts, and the like, and mixtures thereof may be used in accordance with the invention. Exemplary other tertiary aromatic amines include, without limitation, N,N-dimethylaniline (DMA), N,N-diethylaniline (DEA), N,N-dimethyl-p-toluidine (DMPT), and the like and mixtures thereof. Examples of metal salts useful as cure promoters include cobalt, vanadium, zirconium, iron, manganese, chromium, tin, aluminum, lead, and copper salts, and the like, and mixtures thereof. Preferably such metal salts comprise a metal salt of a carboxylic acid, such as a C6–C20 fatty acid, benzoic acid, naphthalenic acid, and the like. Cobalt naphthenate is one advantageous metal salt cure promoter.

The compounds of Formula (I) can be prepared using techniques as known in the art, for example, alkylation of an appropriate N-alkyl-p-toluidine to provide, for example, an N-alkyl-N-(2-hydroxyalkyl)-p-toluidine. For example, MHPT can be prepared by adding a slight molar excess of ethylene oxide to N-methyl-p-toluidine and subjecting the mixture to conditions sufficient to ethoxylate the toluidine compound. The ethoxylation can be performed by methods known in the art.

The compounds of Formula (I) can also be synthesized by alkylation of an appropriate N-hydroxyalkyl-p-toluidine. For example, MHPT can be prepared by adding formaldehyde and hydrogen to a mixture of N-hydroxyethyl-p-toluidine and palladium on a carbon catalyst under appropriate temperature and pressure conditions, such as at 120° C. and 120 psig.

The material obtained by the first route is usable directly out of the reactor. No further purification is required, but distillation can be performed to provide a purer product. The material from the second route should be purified before use.

The vinyl ester resins useful in the present invention may be generally described as an esterification product of a polyepoxide and a monounsaturated monocarboxylic acid. Reference is made to U.S. Pat. No. 3,179,623, which describes the above reactions and resins. Further details about the resins and conditions and methods of making them can be found in the following U.S. Pat. Nos. 3,301,743; 3,317,465; 3,377,406; 3,256,226 and 3,367,992. All the above patents are incorporated herein by reference.

The vinyl ester resins that can be employed in accordance with the teachings of the present invention are prepared (1) by reacting a polyepoxide with an ethylenically unsaturated carboxylic acid to produce a reaction product which contains, in part, the functional group produced by the interaction of an epoxide group with a carboxylic acid group, or (2) by further condensation of the secondary hydroxyl groups contained in the above reaction product with a dicarboxylic acid anhydride to produce pendant half ester groups. The resulting vinyl ester resins can then be admixed with a polymerizable monomer containing a >C=CH$_2$ group. In the first stage of the resin preparation, the polyepoxide is added in an amount sufficient to provide from about 0.8 to 1.2 equivalents of epoxide per equivalent of carboxylic acid. If desired, the further condensation of the secondary hydroxyl groups is completed by the addition of a dicarboxylic acid anhydride to form pendant half ester groups with the secondary alcohol group generated from the epoxide-carboxylic acid reaction. The proportion of this added dicarboxylic acid anhydride can be varied to convert any or all of the secondary hydroxyl groups to pendant half ester groups.

Ethylenically unsaturated carboxylic acids that are suitable for reaction with the polyepoxide include the alpha, beta-unsaturated monocarboxylic acids and the hydroxyalkyl acrylate or methacrylate half esters of dicarboxylic acids. The alpha,beta-unsaturated monocarboxylic acids include such acids as acrylic acid, methacrylic acid, crotonic acid, cinnamic acid and the like. The hydroxylalkyl group of the acrylate or methacrylate half esters preferably may contain from two to six carbon atoms and includes such groups as hydroxyethyl, beta-hydroxy-propyl, beta-hydroxybutyl and the like. It is also intended to include those hydroxyalkyl groups in which an ether oxygen is present. The dicarboxylic acids can be either saturated or unsaturated in nature. Saturated acids include phthalic acid, chlorendic acid, tetrabromophthalic acid, adipic acid, succinic acid, glutaric acid and the like. Unsaturated dicarboxylic acids include maleic acid, fumaric acid, citraconic acids, itaconic acid, halogenated maleic or fumaric acids, mesaconic acid and the like. Mixtures of saturated and ethylenically unsaturated dicarboxylic acids can be employed.

The half esters preferably employed are prepared by reacting substantially equal molar proportions of a hydroxyalkyl acrylate or methacrylate with a dicarboxylic acid anhydride. Other unsaturated anhydrides that can be employed include maleic anhydride, citraconic anhydride, itaconic anhydride and the like; preferred saturated anhydrides that can be employed include phthalic anhydride, tetrabromophthalic anhydride, chlorendic anhydride and the like. Advantageously, a polymerization inhibitor, such as the methyl ether of hydroquinone or hydroquinone, may be added inasmuch as elevated temperatures are useful in preparing the half esters.

Any of the known polyepoxides can be employed in the preparation of the vinyl ester resins of this invention. Useful polyepoxides are glycidyl polyethers of both polyhydric alcohols and polyhydric phenols, epoxy novolacs, cycloaliphatic epoxides, elastomer modified epoxides, halogenated epoxides, epoxidized fatty acids or drying oil acids, epoxidized diolefins, epoxidized di-unsaturated acid esters, epoxidized unsaturated polyesters and mixtures thereof, as long as they contain more than one epoxide group per molecule. The polyepoxides may be monomeric or polymeric in nature.

While the invention is applicable to polyepoxides in general, the preferred polyepoxides include glycidyl polyethers of polyhydric alcohols or polyhydric phenols, having weights per epoxide group of 150 to 2000, preferably 300 to 2000, more preferably 500 to 2000, most preferably 800 to 2000. These polyepoxides are usually made by reacting at least about two moles of an epihalohydrin or glycerol dihalohydrin with one mole of the polyhydric alcohol or polyhydric phenol and a sufficient amount of caustic alkali to combine with the halogen of the halohydrin. The products are characterized by the presence of more than one epoxide group, i.e. a 1,2-epoxy equivalency greater than one.

Suitable dicarboxylic acid anhydrides for reaction with the secondary hydroxyl groups include both the saturated anhydrides, such as phthalic anhydride, tetra-bromophalic anhydride, chlorendic anhydride and the like, and the alpha, beta-unsaturated dicarboxylic acid anhydrides, such as a maleic anhydride, citraconic anhydride, itaconic anhydride and the like.

A wide selection of polymerizable monomers containing a >C=CH$_2$ group is available from the many known classes of vinyl monomers. Preferred polymerizable monomers are styrene, vinyl toluene, ortho-, meta, and parahalostyrenes, vinyl naphthalene, the various alpha-substituted styrenes, as well as the various di-, tri- and tetra-halostyrenes and acrylic, methacrylic and crotonic acid esters, which include both the saturated alcohol esters and the hydroxyalkyl esters. Styrene is the preferred copolymerizable monomer. Generally, the polymerizable monomer is present in amounts ranging from about 20 to 60 weight % of the vinyl ester resin composition depending upon the particular properties desired.

In the preparation of the vinyl ester resins, various inhibitors and catalysts may be used. Any of the well known vinyl polymerization inhibitors, such as hydroquinone or the methyl ether of hydroquinone and the like, can be used, generally in amounts ranging from about 0.001 to about 0.1 weight percent. Additionally, the reaction of the polyepoxide with the carboxylic acid may be conducted either in the presence or absence of a catalyst such as alcoholates, tertiary-amino phenols and the like.

The preferred vinyl ester resins employed in the practice of the present invention are the DERAKANE vinyl ester resins. Exemplary DERAKANE resins include without limitation DERAKANE 411 vinyl ester resins, DERAKANE 411 C vinyl ester resins, DERAKANE 441-400 vinyl ester resins, DERAKANE 470 vinyl ester resins, DERAKANE 8084, vinyl ester resins, DERAKANE 510 A vinyl ester resins, DERAKANE 510 N vinyl ester resins, and DERAKANE 510 C-350 vinyl ester resins. DERAKANE is a Trademark of The Dow Chemical Company. Vinyl ester/styrene compositions are also marketed under other trade names, for example, as "ECO-CRYL" resins by Shell Chemical Co., "CO-REZYNS", by Interplastics Co., "DION VER" by Reichhold Chemicals, Inc., and "VIPEL" resins by AOC for example.

Although the invention has been described in detail with regard to the use of the compounds according to Formula (I) as cure promoters for unsaturated vinyl ester resins, the skilled artisan will appreciate that the compounds of the invention can also be used with other unsaturated polymers capable of being cured using peroxide initiators. For example, the unsaturated resin may be an unsaturated polyester resin as known in the art. The unsaturated polyesters may be obtained by reaction of approximately equivalent amounts of a polyvalent alcohol such as ethylene glycol, diethylene glycol, triethylene glycol, trimethylene glycol, propylene glycol, pentaerythritol, and other diols or polyols with an unsaturated dibasic carboxylic acid or carboxylic anhydride such as maleic acid, maleic anhydride, fumaric acid, itaconic acid, or citraconic acid. These unsaturated dibasic carboxylic acids or anhydrides are often used in combination with aromatic and/or saturated aliphatic dicarboxylic acids or the anhydrides derived therefrom, such as phthalic acid, phthalic anhydride, isophthalic acid, tetrachlorophthalic acid, malonic acid, adipic acid, sebacic acid, tartaric acid, and the like.

Unsaturated polyesters containing vinyl groups or vinylidene groups may be obtained by polycondensation of alpha,beta-unsaturated monocarboxylic acids such as acrylic or methacrylic acid, with mono-, di- or polyhydric alcohols. Exemplary alcohols include methanol, ethanol, isopropanol, cyclohexanol, phenol, ethylene glycol, propylene glycol, 2,2-bis(4-hydroxyphenyl)propane, 2,2-bis(4-hydroxycyclohexyl)propane, 2,2-bis(4-beta-hydroxyethyloxy-phenyl)propane, pentaerythritol and dimers thereof, trimethol propane and a glycerol, and the complex diols or polyols. Unsaturated polyesters containing vinyl groups or vinylidene groups also may be obtained by reacting alpha,beta-unsaturated monocarboxylic acids with compounds containing epoxy groups, such as bisphenol A bis(glycidyl ether).

Further, the unsaturated polyesters can be dissolved in monomers copolymerizable with the polyester, which contain one or more C=C groups such as styrene, vinyl toluene, methylmethacrylate, ethyleneglycolmethacrylate, and the like, as is also conventional. The preferred solutions are those which contain from about 70 to 50 percent by weight of unsaturated polyester and 30 to 50 percent by weight of copolymerizable monomer. Styrene is a preferred copolymerizable monomer.

Other unsaturated polymers useful in the invention include conventional polyurethane acrylate resins known in the art. The unsaturated polyurethane may be obtained by reaction of a polyisocyanate, such as toluene diisocyanate, diphenylmethane diisocyanate, hexamethylene diisocyanate, and the like, with an appropriate compound containing at least two active hydrogen atoms, such as a polyol or a polyamine. Exemplary polyols include ethylene glycol, diethylene glycol, triethylene glycol, trimethylene glycol, propylene glycol, pentaerytlritol, and other diols or polyols. Urethane polymers may be used in the form of homopolymers or, more preferably, with various other monomers which can be copolymerized therewith. For example, urethane polymers can be prepared by reacting any of a variety of acrylic comonomers, such as acrylic and methacrylic acids, and their amides, esters, salts and corresponding nitriles, with the polyurethane resin. Particularly suitable comonomers for such polymers are methyl methacrylate, ethyl acrylate and acrylonitrile.

Yet another exemplary unsaturated polymer which can be treated using the compounds of Formula (I) include unsaturated epoxy resins known in the art. Unsaturated epoxy resins may be obtained by reaction of an epoxide group (resulting form the union of an oxygen atom with two other atoms, usually carbon), such as epichlorohydrin, oxidized polyolefins, for example ethylene oxide, with an aliphatic or aromatic alcohol such as bisphenol A, glycerol, etc. As with the unsaturated polymers described above, the epoxy resins may be used in the form of homopolymers or copolymers with various other comonomers which can be reacted therewith, including various acrylic monomers, such as acrylic and methacrylic acids, and their amides, esters, salts and corresponding nitriles.

To improve the stability of the unsaturated polyesters, inhibitors are commonly used in amounts ranging from about 0.001 to 0.1 percent by weight. The most commonly used inhibitors include quinones or catechols, such as but not limited to hydroquinone, hydroquinone monomethyl ether, quinone, and p-tert-butyl catechol.

The unsaturated polymer resin will generally comprise a significant component of the resin system and thus is typically present in an amount in a range from about 10 to about 100 weight percent, and preferably from about 50 to about 100 weight percent, of the resin system.

The resin systems may include other agents, such as but not limited to: thixotropic agents such as fumed silica and modified fumed silica, carboxy cellulose; pigments; inert fillers such as silica, calcium carbonate, titanium dioxide, magnesium oxide; and fibrous reinforcing material such as randomly oriented glass fibers or woven glass fabrics. Such agents can be present in conventional amounts.

To cure the pre-promoted resin system, the resin is typically combined with a suitable polymerization or copolymerization initiator. The polymerization or copolymerization initiators which can be used are those conventionally available and include hydrogen peroxide, the ketone peroxides, such as acetylacetone peroxide, methylethylketone peroxide, cyclohexanone peroxide and methylisobutylketone peroxide; the diacyl peroxides, such as benzoyl peroxide, lauroyl peroxide, isobutyryl peroxide, acetyl peroxide, 2,4-dichlorobenzoyl peroxide, succinic acid peroxide, decanoyl peroxide, diisononanoyl peroxide; the peresters, such as tert-butyl peroxide-2-ethyl hexanoate; the perketals, such as 1,1-ditert-butylperoxy-3,3,5-trimethyl cyclohexane and dialkyl peroxides, such as 1,3-bis(tert-butylperoxyisopropyl) benzene. The diacyl peroxides, and particularly benzoyl peroxide, are the preferred initiators. The initiators are used in amounts known in the art, for example, for peroxide initiators, between about 0.01 and 10 percent by weight.

Although described above primarily in terms of a "pre-promoted" resin system, the present invention also includes curable resin systems which include the polymerization initiators as well. For example, the resin systems can include the resin, cure promoter of formula (I) and polymerization initiator.

The unsaturated resin systems of the invention are useful in a variety of applications, including body putties, reinforced plastic components, boat hulls, fireproof molded articles, linings, paints, coating compositions, tanks, vessels, scrubbers, smoke stacks, pipe linings and other composite materials. The systems of the invention can be supplied as a two package system, one package including the pre-promoted unsaturated polymer resin with filler and the other package containing the polymerization or curing initiator. Conventional fillers such as talc, silicates, carbonates, clays, glass fibers, and the like in conventional amounts can be used.

The present invention will be further illustrated by the following non-limiting examples.

EXAMPLE 1

Synthesis of N-methyl-N-(2-hydroxyethyl)-p-toluidine (MHPT)

N-(2-hydroxyethyl)-p-toluidine, 50 g, was combined with 1 g 5% palladium on carbon catalyst and charged to a pressure reactor. The pressure reactor was heated to 120° C. and fed hydrogen gas to maintain 120 psig pressure. Formaldehyde, 178 g 37% solution in water, was fed to the pressure reactor over 10 hours. After hydrogen uptake ceased, the reaction mass was filtered to remove catalyst and decanted to separate the aqueous phase.

The organic phase was charged to a vacuum distillation apparatus. Water and low boilers were removed. N-methyl-N-(2-hydroxyethyl)-p-toluidine product was collected at overhead temperatures around 148° C. Melting point was 28–30° C.

EXAMPLE 2

Synthesis of N-ethyl-N-(2-hydroxyethyl)-p-toluidine (EHPT)

N-ethyl-N-(2-hydroxyethyl)-p-toluidine (EHPT) was prepared substantially as described above in Example 1, except that acetaldehyde was added to ethylate N-(2-hydroxyethyl)-p-toluidine.

EXAMPLE 3

Synthesis of N-methyl-N-(2-hydroxypropyl)-p-toluidine (2HPMT)

N-methyl-p-toluidine, 29.3 g, and methanol, 50 g, were placed in a reactor. Propylene oxide, 25.4 g, was slowly added to the reactor over two hours. Afterwards, the reactor was heated under reflux for 6 hours. The low boilers were removed by distillation. Then, the mixture was vacuum distilled to give 2HPMT. The boiling point is 92° C. at 5 mm Hg.

EXAMPLE 4

Gel and Cure Time Drift Study—Nitrogen Purged Systems

A study was undertaken to examine gel-time drift as a function of shelf-storage time using four different promoters in a pre-promoted vinyl ester resin system. At the beginning of the experiment, individual samples were sealed in Teflon-lined paint cans, under an atmosphere of dry nitrogen gas, and opened at predetermined times for gel and cure time measurement. The four promoters used (shown below) were N, N-dimethylailine (DMA, Aldrich), Bisomer PTE (International Specialty Chemicals), N,N-dimethyl-p-toluidine (DMPT, First Chemical Corp.), N-methyl-N-hydroxyethyl-p-toluidine (MHPT, First Chemical Corp.). A mixture (50/50, wt/wt) of DMPT and MHPT was also investigated. The vinyl ester resin used was Derakane 411-350 (Dow Chemical Co.).

Thirty samples (six for each individual promoter and six for MHPT/DMPT mixture) were individually mixed to yield a final promoter concentration of 0.3 wt %, according to the following formula:

| | |
|---|---|
| Derakane 411-350 | 97.70 g |
| Promoter | 0.30 g |
| Total mass | 98.00 g |

Each sample weighed a total of 98 g so that 100 g total reaction mass would be obtained upon initiation. One sample for each promoter was initiated to obtain initial gel and cure times. All other samples were individually sealed within a Teflon-lined paint can, under an atmosphere of dry nitrogen gas.

Figure 1:
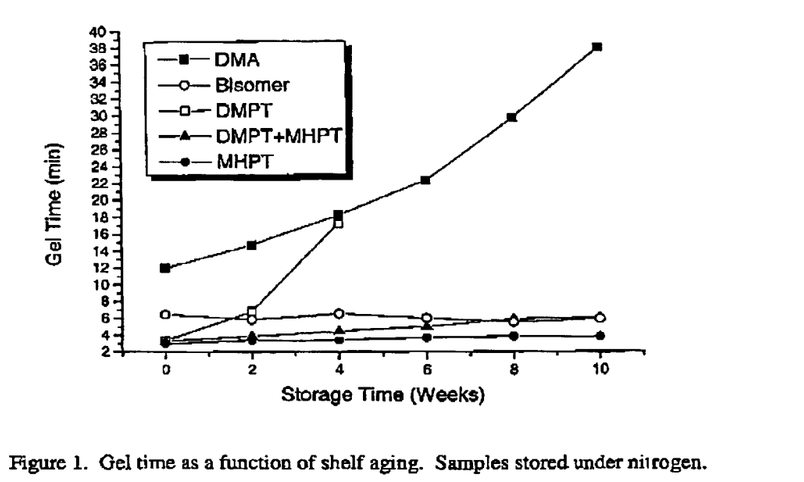
FIGS. 1, 2, 3 and 4 are graphs illustrating gel and cure times, respectively, in minutes for a vinyl ester resin as a function of shelf aging (in weeks).
Figure 2:
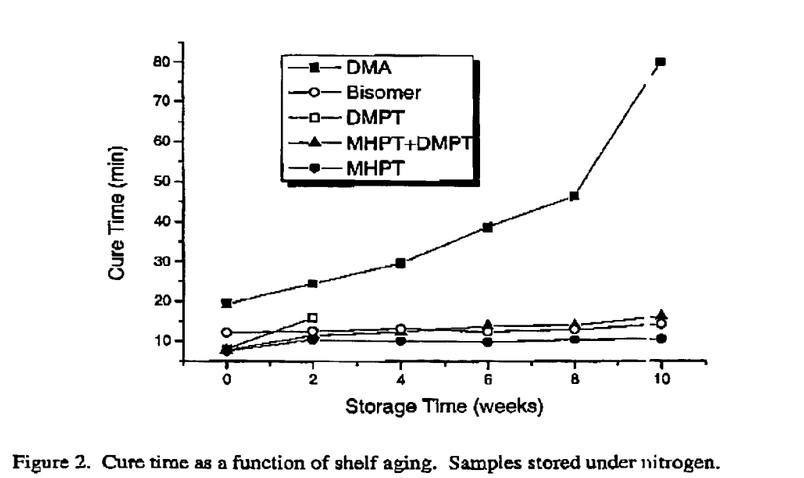

Every two weeks, five samples (each containing a different promoter) were initiated with 2 g benzoyl peroxide (BPO) dispersion (50 wt % in tricresylphosphate) by weighing the initiator onto a wooden tongue blade and charging it into the sample. The reacting mass was periodically probed with the blade, and gel time was recorded as the time from charging of the initiator to the point when the resin snapped back from the blade in a rubbery manner. At the gel-time a thermometer sheathed in aluminum was placed in the center of the sample. The maximum temperature reached during cure was recorded as the peak exotherm, and the cure time was recorded as the time from addition of the initiator to the peak exotherm. Graphs of gel and cure times obtained in the 10 weeks are shown in FIGS. 1 and 2.

The greatest drift took place in systems using promoters with only alkyl substituents (DMA, DMPT). DMA drifted gradually throughout the study. After ten weeks passed, a significant increase in gel and cure times was observed. DMPT experienced the greatest drift. After four weeks DMPT-promoted samples would not even reach the gel phase. The samples that were promoted with the mixture of DMPT and MHPT drifted far less than those promoted with either DMA or DMPT; however, they did experience a noticeable drift. The remaining two promoters are those that contain hydroxyethyl groups. Bisomer PTE and MHPT experienced negligible drift over this period of time. MHPT proved the most efficient promoter giving gel and cure times considerably shorter than Bisomer PTE.

EXAMPLE 5

Gel and Cure Time Drift Study—Without Nitrogen Purge

A study was undertaken to examine gel-time drift as a function of shelf-storage time using four different promoters in a pre-promoted vinyl ester resin system. At the beginning of the experiment, individual samples were sealed in Teflon-lined paint cans, under an atmosphere of air, and opened at predetermined times for gel and cure time measurement. The four promoters used (shown below) were N,N-dimethylaniline (DMA, Aldrich), Bisomer PTE (International Specialty Chemicals), N,N-dimethyl-p-tiluidine (DMPT, First Chemical Corp.), and N-methyl-N-hydroxyethyl-p-toluidine (MHPT, First Chemical Corp.). A mixture (50/50, wt/wt) of MHPT and DMPT was also investigated. The vinyl ester resin used was Derakane 411-350 (Dow Chemical Co.).

Five masterbatch mixtures were formulated (one for each individual promoter and one for the MHPT/DMPT mixture) to yield a final promoter concentration of 0.3 wt %, according to the following formula:

| Derakane 411-350 | 586.20 g |
| --- | --- |
| Promoter | 1.80 g |
| Total mass | 588.00 g |

Each masterbatch was formulated to yield six 98 g samples. A sample size of 98 g was specified so that 100 g total reaction mass would be obtained upon initiation.

Each masterbatch was vigorously stirring to ensure complete mixing. Then, five 98.00 g samples were drawn from each masterbatch and sealed individually within a Teflon-lined paint can under an atmosphere of air. The remaining 98.00 g of each materbatch was initiated to obtain initial gel and cure times.

Figure 3:
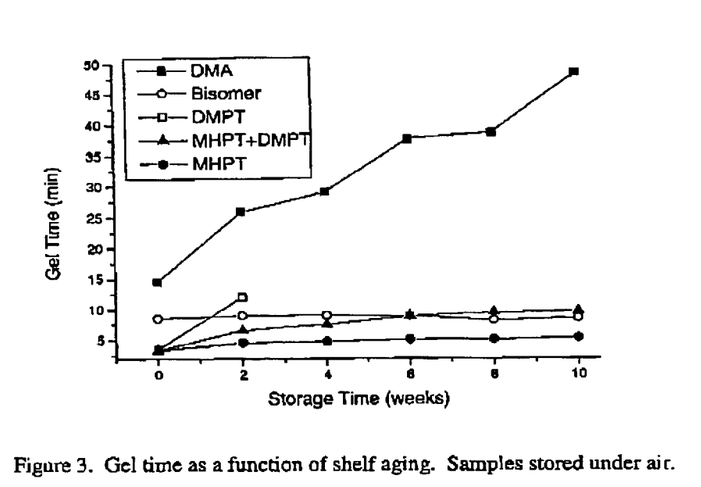
Figure 4:
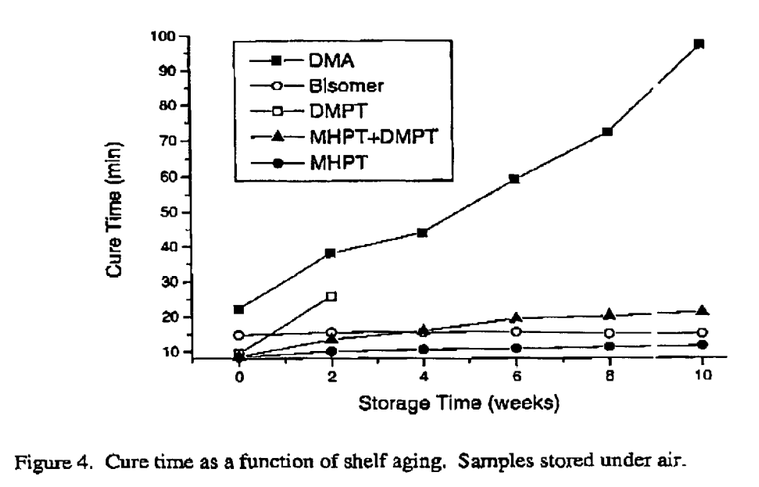

Every two weeks, five samples (each containing a different promoter) were initiated with 2 g benzoyl peroxide (BPO) dispersion (50 wt % in tricresylphosphate) by weighing the initiator onto a wooden tongue blade and charging it into the sample. The reacting mass was periodically probed with the blade, and gel time was recorded as the time from charging of the initiator to the point when the resin snapped back from the blade in a rubbery manner. At the gel-time a thermometer sheathed in aluminum was placed in the center of the sample. The maximum temperature reached during cure was recorded as the peak exotherm, and the cure time was recorded as the time from addition of the initiator to the peak exotherm. Graphs of gel and cure times obtained in the 10 weeks are shown in FIGS. 3 and 4.

The greatest drift took place in systems using promoters with only alkyl substituents (DMA, DMPT). DMA drifted gradually throughout the study. After ten weeks passed, a significant increase in gel and cure times was observed. DMPT experienced the greatest drift. After two weeks DMPT-promoted samples would not even reach the gel phase. The samples that were promoted with the MHPT/DMPT mixture drifted far less than those promoted with either DMA or DMPT; however, they did experience a noticeable drift. The remaining two promoters are those that contain hydroxyethyl groups. Bisomer PTE and MHPT experienced negligible drift over this period of time. MHPT proved the most efficient promoter giving gel and cure times considerably shorter than Bisomer PTE.

Thus, the present invention provides a pre-promoted unsaturated polymer resin system comprising a vinyl ester resin comprising the reaction product of a polyepoxide and an ethylenically unsaturated carboxylic acid and a cure promoter of the formula (I):

(I)

wherein:
each A is independently selected from the group consisting of linear or branched C1 to C20, preferably C1 to C6, alkyl; C3 to C20, preferably C3 to C6, cycloalkyl; and functionalized linear or branched C1 to C20 alkyl comprising a heteroatom, with the proviso that both As are not linear or branched C1 to C20 alkyl;

$R_5$, $R_6$, $R_7$, $R_8$, and $R_9$ are each independently selected from the group consisting of H, linear or branched C1 to C20, preferably C1 to C6, alkyl, C3 to C20, preferably C3 to C6, cycloalkyl, and C1 to C20, preferably C1 to C6, alkoxy; and wherein the cure promoter and the vinyl ester resin are combined for storage for a significant period of time with only negligible effect on gel time and cure time, as noted in FIGS. 1–4.

By "negligible effect" is meant no substantial effect over the course of significant storage time, such as at least about one week to about two weeks or more. As shown in FIGS. 1–4, the gel time and cure times of inventive embodiments were stable for at least ten weeks when stored under nitrogen or air. As shown in FIGS. 3–4, the gel time of one inventive embodiment changed by less than five minutes over a ten-week period. Preferably, the gel time of the inventive embodiment changes less than about 8 minutes, more preferably less than about 5 minutes, and most preferably less than about 3 minutes, after ten weeks of storage. Additionally, for several inventive embodiments, cure time changed no more than 15 minutes over a two week time period, preferably no more than 10 minutes, and most preferably no more than 8 minutes or 5 minutes. The cure time changed no more than 20 minutes over a six-week time period, preferably no more than 12 minutes, and most preferably no more than 10 minutes or even 5 minutes. The cure time changed no more than 25 minutes over a ten-week period, preferably no more than 14 minutes, and most preferably, no more than 10 minutes or even 5 minutes. As shown in FIGS. 1 and 2, changes in gel time and cure time were even smaller when samples were stored under nitrogen.

Accordingly, the present invention also provides a method of forming a storage stable curable pre-promoted unsaturated polymer resin system comprising a vinyl ester resin comprising the reaction product of a polyepoxide and an ethylenically unsaturated carboxylic acid and a cure promoter of the formula (I), wherein the system is storage stable for at least about one week prior to the addition of a polymerization initiator. By storage stable is meant that the resin system has improved storage stability with negligible effect on gel time or cure time as discussed above. By "pre-promoted" is meant that the polymer resin system is free or substantially free of polymerization initator.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A curable pre-promoted unsaturated polymer resin system comprising a vinyl ester resin comprising the reaction product of a polyepoxide and an ethylenically unsaturated carboxylic acid and a cure promoter of the formula (I):

(I)

wherein:
each A is independently selected from the group consisting of linear or branched C1 to C20 alkyl; C3 to C20 cycloalkyl; and functionalized linear or branched C1 to C20 alkyl comprising a heteroatom, with the proviso that both As are not linear or branched C1 to C20 alkyl;
$R_5$, $R_6$, $R_7$, $R_8$, and $R_9$ are each independently selected from the group consisting of H, linear or branched C1 to C20 alkyl, C3 to C20 cycloalkyl, and C1 to C20 alkoxy; and
wherein said pre-promoted polymer resin system is capable of storage for at least about two weeks with negligible effect on gel time or cure time.

2. The curable pre-promoted unsaturated polymer resin system of claim 1, wherein:
each A is independently selected from the group consisting of linear or branched C1 to C6 alkyl; C3 to C6 cycloalkyl; and functionalized linear or branched C1 to C6 alkyl comprising a heteroatom, with the proviso that both As are not linear or branched C1 to C6 alkyl; and
$R_5$, $R_6$, $R_7$, $R_8$, and $R_9$ are each independently selected from the group consisting of H, linear or branched C1 to C6 alkyl, C3 to C6 cycloalkyl, and C1 to C6 alkoxy.

3. The curable pre-promoted unsaturated polymer resin system of claim 1, wherein said heteroatom comprises one or more oxygen, nitrogen, sulfur, or halogen atoms.

4. The curable pre-promoted unsaturated polymer resin system of claim 3, wherein said heteroatom comprises one or more halogen atoms selected from the group consisting of chlorine and bromine atoms.

5. The curable pre-promoted unsaturated polymer resin system of claim 1, wherein at least one A is functionalized linear or branched C1 to C20 alkyl comprising a heteroatom.

6. The curable pre-promoted unsaturated polymer resin system of claim 1, wherein at least one A is linear or branched C1 to C20 alkyl or C3 to C20 cycloalkyl; and the other A is functionalized linear or branched C1 to C20 alkyl comprising a heteroatom.

7. The curable pre-promoted unsaturated polymer resin system of claim 1, wherein both As are functionalized linear or branched C1 to C20 alkyl comprising a heteroatom.

8. The curable pre-promoted unsaturated polymer resin system of claim 1, wherein at least one A is:

wherein:
$R_2$ is H, linear or branched C1 to C20 alkyl, or C3 to C20 cycloalkyl, wherein said C1 to C20 alkyl or C3 to C20 cycloalkyl is optionally substituted at the C1 or C3 position, respectively, by X as defined below;
$R_3$ and $R_4$ are each independently selected from the group consisting of H, linear or branched C1 to C20 alkyl, and C3 to C20 cycloalkyl; and
X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl.

9. The curable pre-promoted unsaturated polymer resin system of claim 8, wherein X is OH, $O[(CH_2)_mO]_nH$, or $[(CH_2)_mO]_nH$, wherein at least one H of each $(CH_2)_m$ group can be optionally substituted with straight chain or branched C1—C6 alkyl, m=2, and n=1 to 6.

10. The curable pre-promoted unsaturated polymer resin system of claim 8, wherein the other A is methyl and $R_7$ is linear or branched C1 to C6 alkyl, C3 to C6 cycloalkyl or C1 to C6 alkoxy.

11. The curable pre-promoted unsaturated polymer resin system of claim 1, wherein each A is wherein:
$R_2$ is H, linear or branched C1 to C20 alkyl, or C3 to C20 cycloalkyl, wherein said C1 to C20 alkyl or C3 to C20 cycloalkyl is optionally substituted at the C1 or C3 position, respectively, by X as defined below;

$R_3$ and $R_4$ are each independently selected from the group consisting of H, linear or branched C1 to C20 alkyl, and C3 to C20 cycloalkyl; and X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl.

12. The curable pre-promoted unsaturated polymer resin system of claim 11, wherein X is OH, $O[(CH_2)_mO]_nH$, or $[(CH_2)_mO]_nH$, wherein at least one H of each $(CH_2)_m$ group can be optionally substituted with straight chain or branched C1–C6 alkyl, m=2, and n=1 to 6.

13. The curable pre-promoted unsaturated polymer resin system of claim 1, wherein said cure promoter comprises a compound selected from the group consisting of N-methyl-N-(2-hydroxyethyl)-p-toluidine (MHPT), N-ethyl-N-(2-hydroxyethyl)-p-toluidine (EHPT), N-methyl-N-(2-hydroxypropyl)-p-toluidine (2HPMT), N-(2-hydroxyethyl)-N-methyl aniline, N-(2-hydroxyethyl)-N-ethyl aniline, N,N-bis-(2-hydroxyethyl)-m-toluidine, N-(2-hydroxyethyl)-N-[2-(2-hydroxyethoxy) ethylaniline, N,N-bis-(2-hydroxyethyl)-p-toluidine (HEPT), N-(8-hydroxy-3,6-dioxooctyl)-N-methyl-p-toluidine, N-(8-hydroxy-1,4,7-trimethyl-3,6-dioxooctyl)-N-methyl-p-toluidine, N-(2-hydroxyetheyl)-N-tribromomethyl)-N-methyl-p-toluidine, N-(1,1-dibromo-2-hydroxyethyl)-N-methyl-p-toluidine, and mixtures thereof.

14. The curable pre-promoted unsaturated polymer resin system of claim 13, wherein said cure promoter is N-methyl-N-(2-hydroxyethyl)-p-toluidine (MHPT).

15. The curable pre-promoted unsaturated polymer resin system of claim 1, wherein said polyepoxide is a glycidyl polyether of polyhydric alcohols or polyhydric phenols, having weights per epoxide group in the range of from about 300 to about 2,000.

16. The curable pre-promoted unsaturated polymer resin system of claim 15, wherein the weights per epoxide group is in the range of from about 500 to about 2,000.

17. The curable pre-promoted unsaturated polymer resin system of claim 1, wherein said system is capable of storage for at least about six weeks with negligible effect on gel time or cure time.

18. The curable pre-promoted unsaturated polymer resin system of claim 1, wherein said system is capable of storage for at least about ten weeks with negligible effect on gel time or cure time.

19. The curable pre-promoted unsaturated polymer resin system of claim 1, comprising a mixture of said cure promoter of Formula (I) with at least one additional cure promoter.

20. The curable pre-promoted unsaturated polymer resin system of claim 19, wherein said at least one additional cure promoter comprises a tertiary aromatic amine cure promoter.

21. The curable pre-promoted unsaturated polymer resin system of claim 20, wherein said at least one additional cure promoter comprises a tertiary aromatic amine cure promoter selected from the group consisting of N,N-dimethylaniline (DMA), N,N-diethylaniline (DEA), N,N-dimethyl-p-toluidine (DMPT), and mixtures thereof.

22. The curable pre-promoted unsaturated polymer resin system of claim 21, wherein said at least one additional cure promoter comprises N,N-dimethyl-p-toluidine (DMPT).

23. The curable pre-promoted unsaturated polymer resin system of claim 19, wherein said at least one additional cure promoter comprises a metal salt.

24. A curable pre-promoted unsaturated polymer resin system comprising a vinyl ester resin comprising the reaction product of a polyepoxide and an ethylenically unsaturated carboxylic acid and a cure promoter of the formula:

wherein:

$R_1$ is linear or branched C1 to C6 alkyl or C3 to C6 cycloalkyl;

$R_2$ is H, linear or branched C1 to C6 alkyl, or C3 to C6 cycloalkyl, wherein said C1 to C6 alkyl or C3 to C6 cycloalkyl is optionally substituted at the C1 or C3 position, respectively, by X as defined below;

$R_3$ and $R_4$ are each independently selected from the group consisting of H, linear or branched C1 to C6 alkyl, and C3 to C6 cycloalkyl;

$R_5$, $R_6$, $R_7$, $R_8$, and $R_9$ are each independently selected from the group consisting of H, linear or branched C1 to C6 alkyl, C3 to C6 cycloalkyl, and C1 to C6 alkoxy;

X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl; and wherein said pre-promoted polymer resin system is capable of storage for at least about two weeks with negligible effect on gel time or cure time.

25. The curable pre-promoted unsaturated polymer resin system of claim 24, wherein:

$R_1$ is methyl or ethyl;

$R_2$ is H or hydroxymethyl;

$R_3$ or $R_4$ are each independently selected from the group consisting of H, methyl and ethyl;

$R_5$, $R_6$, $R_7$, $R_8$, and $R_9$ are each independently selected from the group consisting of H and methyl; and X is OH, $O[(CH_2)_mO]_nH$, or $[(CH_2)_mO]_nH$, wherein at least one H of each $(CH_2)_m$ group can be optionally substituted with straight chain or branched C1–C6 alkyl, m=2, and n=1 to 6.

26. The curable pre-promoted unsaturated polymer resin system of claim 24, wherein $R_1$ is methyl and $R_7$ is linear or branched C1 to C6 alkyl, C3 to C6 cycloalkyl or C1 to C6 alkoxy.

27. The curable pre-promoted unsaturated polymer resin system of claim 24, wherein said cure promoter comprises a compound selected from the group consisting of N-methyl-N-(2-hydroxyethyl)-p-toluidine (MHPT), N-ethyl-N-(2-hydroxyethyl)-p-toluidine (EHPT), N-methyl-N-(2-hydroxypropyl)-p-toluidine (2HPMT), and mixtures thereof.

28. The curable pre-promoted unsaturated polymer resin system of claim 27, wherein said cure promoter is N-methyl-N-(2-hydroxyethyl)-p-toluidine (MHPT).

29. The curable pre-promoted unsaturated polymer resin system of claim 28, comprising a mixture of said cure promoter of Formula (I) with at least one additional cure promoter.

30. The curable pre-promoted unsaturated polymer resin system of claim 29, wherein said at least one additional cure promoter comprises a tertiary aromatic amine cure promoter.

31. The curable pre-promoted unsaturated polymer resin system of claim 30, wherein said at least one additional cure promoter comprises a tertiary aromatic amine cure promoter selected from the group consisting of N,N-dimethylaniline (DMA), N,N-diethylaniline (DEA), N,N-dimethyl-p-toluidine (DMPT), and mixtures thereof.

32. The curable pre-promoted unsaturated polymer resin system of claim 31, wherein said at least one additional cure promoter comprises N,N-dimethyl-p-toluidine (DMPT).

33. The curable pre-promoted unsaturated polymer resin system of claim 29, wherein said at least one additional cure promoter comprises a metal salt.

34. A curable pre-promoted unsaturated polymer resin system consisting essentially of an unsaturated polymer resin and a cure promoter of the formula:

wherein:
R$_2$ is H, linear or branched C1 to C20 alkyl, or C3 to C20 cycloalkyl, wherein said C1 to C20 alkyl or C3 to C20 cycloalkyl is optionally substituted at the C1 or C3 position, respectively, by X as defined below;
R$_3$ and R$_4$ are each independently selected from the group consisting of H, linear or branched C1 to C20 alkyl, and C3 to C20 cycloalkyl;
R$_5$, R$_6$, R$_8$, and R$_9$ are each independently selected from the group consisting of H, linear or branched C1 to C20 alkyl, C3 to C20 cycloalkyl, and C1 to C20 alkoxy;
R$_7$ is linear or branched C1 to C20 alkyl, C3 to C20 cycloalkyl or C1 to C20 alkoxy;
X is OH, OR$_1$; CN, OC(O)R$_1$, O[(CH$_2$)$_m$O]$_n$H, O[(CH$_2$)$_m$O]$_n$R$_1$, [(CH$_2$)$_m$O]$_n$H, [(CH$_2$)$_m$O]$_n$R$_1$, or NC(O)R$_1$, wherein at least one H of each (CH$_2$)$_m$ group can be optionally substituted with straight chain or branched C1–C20 alkyl, m=1 to 6, n=1 to 6, and each R$_1$ is independently linear or branched C1 to C18 alkyl or C3 to C18 cycloalkyl; and
wherein said pre-promoted polymer resin system is capable of storage for at least about two weeks with negligible effect on gel time or cure time.

35. The curable pre-promoted unsaturated polymer resin system of claim 34, wherein X is OH, O[(CH$_2$)$_m$O]$_n$H, or [(CH$_2$)$_m$O]$_n$H, wherein at least one H of each (CH$_2$)$_m$ group can be optionally substituted with straight chain or branched C1–C6 alkyl, m=2, and n=1 to 6.

36. The curable pre-promoted unsaturated polymer resin system of claim 35, wherein said cure promoter comprises a compound selected from the group consisting of N-methyl-N-(2-hydroxyethyl)-p-toluidine (MHPT), N-methyl-N-(2-hydroxypropyl)-p-toluidine (2HPMT), and mixtures thereof.

37. The curable pre-promoted unsaturated polymer resin system of claim 36, wherein said cure promoter is N-methyl-N-(2-hydroxyethyl)-p-toluidine (MHPT).

38. The curable pre-promoted unsaturated polymer resin system of claim 34, further comprising at least one additional cure promoter.

39. The curable pre-promoted unsaturated polymer resin system of claim 38, wherein said at least one additional cure promoter comprises a tertiary aromatic amine cure promoter.

40. The curable pre-promoted unsaturated polymer resin system of claim 39, wherein said at least one additional cure promoter comprises a tertiary aromatic amine cure promoter selected from the group consisting of N,N-dimethylaniline (DMA), N,N-diethylaniline (DEA), N-(2-hydroxyethyl)-N-methyl aniline, N-(2-hydroxyethyl)-N-ethyl aniline, N,N-bis-(2-hydroxyethyl)-m-toluidine, N-(2-hydroxyethyl)-N-[2-(2-hydroxyethoxy) ethylaniline, N,N-bis-(2-hydroxyethyl)-p-toluidine (HEPT), N,N-dimethyl-p-toluidine (DMPT), and mixtures thereof.

41. The curable pre-promoted unsaturated polymer resin system of claim 40, wherein said at least one additional cure promoter comprises N,N-dimethyl-p-toluidine (DMPT).

42. The curable pre-promoted unsaturated polymer resin system of claim 34, wherein said unsaturated polymer resin is an unsaturated polyester resin.

43. A process for the preparation of a curable pre-promoted unsaturated polymer resin system comprising:
combining a vinyl ester resin comprising the reaction product of a polyepoxide and an ethylenically unsaturated carboxylic acid with a cure promoter to form a pre-promoted curable polymer system, the cure promoter having the formula (I):

(I)

wherein:
each A is independently selected from the group consisting of linear or branched C1 to C20 alkyl; C3 to C20 cycloalkyl; and functionalized linear or branched C1 to C20 alkyl comprising a heteroatom, with the proviso that both As are not linear or branched C1 to C20 alkyl;
R$_5$, R$_6$, R$_7$, R$_8$, and R$_9$ are each independently selected from the group consisting of H, linear or branched C1 to C20 alkyl, C3 to C20 cycloalkyl, and C1 to C20 alkoxy; and
storing said pre-promoted curable polymer system for a period of at least about one week prior to polymerization initiation of said curable polymer system.

44. The process of claim 43 further comprising the step of curing the pre-promoted curable polymer resin system.

45. The process of claim 43, wherein storing is for a period of at least about two weeks prior to polymerization initiation of said curable polymer system.

46. The process of claim 43, wherein storing is for a period of at least about six weeks prior to polymerization initiation of said curable polymer system.

47. The process of claim 43, wherein the storing step is for a period of at least about ten weeks prior to polymerization initiation of said curable polymer system.

48. The process of claim 43, wherein:
   each A is independently selected from the group consisting of linear or branched C1 to C6 alkyl; C3 to C6 cycloalkyl; and functionalized linear or branched C1 to C6 alkyl comprising a heteroatom, with the proviso that both As are not linear or branched C1 to C6 alkyl; and
   $R_5$, $R_6$, $R_7$, $R_8$, and $R_9$ are each independently selected from the group consisting of H, linear or branched C1 to C6 alkyl, C3 to C6 cycloalkyl, and C1 to C6 alkoxy.

49. The process of claim 43, wherein said heteroatom comprises one or more oxygen, nitrogen, sulfur, or halogen atoms.

50. The process of claim 49, wherein said heteroatom comprises one or more halogen atoms selected from the group consisting of chlorine and bromine atoms.

51. The process of claim 43, wherein at least one A is functionalized linear or branched C1 to C20 alkyl comprising a heteroatom.

52. The process of claim 43, wherein at least one A is linear or branched C1 to C20 alkyl or C3 to C20 cycloalkyl; and the other A is functionalized linear or branched C1 to C20 alkyl comprising a heteroatom.

53. The process of claim 43, wherein both As are functionalized linear or branched C1 to C20 alkyl comprising a heteroatom.

54. The process of claim 43, wherein at least one A is:

wherein:
   $R_2$ is H, linear or branched C1 to C20 alkyl, or C3 to C20 cycloalkyl, wherein said C1 to C20 alkyl or C3 to C20 cycloalkyl is optionally substituted at the C1 or C3 position, respectively, by X as defined below;
   $R_3$ and $R_4$ are each independently selected from the group consisting of H, linear or branched C1 to C20 alkyl, and C3 to C20 cycloalkyl; and
   X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl.

55. The process of claim 54, wherein X is OH, $O[(CH_2)_mO]_nH$, or $[(CH_2)_mO]_nH$, wherein at least one H of each $(CH_2)_m$ group can be optionally substituted with straight chain or branched C1–C6 alkyl, m=2, and n=1 to 6.

56. The process of claim 54, wherein the other A is methyl and $R_7$ is linear or branched C1 to C6 alkyl, C3 to C6 cycloalkyl or C1 to C6 alkoxy.

57. The process of claim 43, wherein each A is wherein:
   $R_2$ is H, linear or branched C1 to C20 alkyl, or C3 to C20 cycloalkyl, wherein said C1 to C20 alkyl or C3 to C20 cycloalkyl is optionally substituted at the C1 or C3 position, respectively, by X as defined below;
   $R_3$ and $R_4$ are each independently selected from the group consisting of H, linear or branched C1 to C20 alkyl, and C3 to C20 cycloalkyl; and
   X is OH, $OR_1$, CN, $OC(O)R_1$, $O[(CH_2)_mO]_nH$, $O[(CH_2)_mO]_nR_1$, $[(CH_2)_mO]_nH$, $[(CH_2)_mO]_nR_1$, or $NC(O)R_1$, wherein at least one H of each $(CH_2)_m$ group can be optionally substituted with straight chain or branched C1–C20 alkyl, m=1 to 6, n=1 to 6, and each $R_1$ is independently linear or branched C1 to C18 alkyl or C3 to C18 cycloalkyl.

58. The process of claim 57, wherein X is OH, $O[(CH_2)_mO]_nH$, or $[(CH_2)_mO]_nH$, wherein at least one H of each $(CH_2)_m$ group can be optionally substituted with straight chain or branched C1–C6 alkyl, m=2, and n=1 to 6.

59. The process of claim 43, wherein said cure promoter comprises a compound selected from the group consisting of N-methyl-N-(2-hydroxyethyl)-p-toluidine (MHPT), N-ethyl-N-(2-hydroxyethyl)-p-toluidine (EHPT), N-methyl-N-(2-hydroxyethyl)-p-toluidine (2HPMT), N-(2-hydroxyethyl)-N-methyl aniline, N-(2-hydroxyethyl)-N-ethyl aniline, N,N-bis-(2-hydroxyethyl)-m-toluidine, N-(2-hydroxyethyl)-N-[2-(2-hydroxyethoxy)ethylaniline, N,N-bis-(2-hydroxyethyl)-p-toluidine (HEPT), N-(8-hydroxy-3,6-dioxooctyl)-N-methyl-p-toluidine, N-(8-hydroxy-1,4,7-trimethyl-3,6-dioxooctyl)-N-methyl-p-toluidine, N-(2-hydroxyethyl)-N-tribromomethyl)-N-methyl-p-toluidine, N-(1,1-dibromo-2-hydroxyethyl)-N-methyl-p-toluidine, and mixtures thereof.

60. The process of claim 59, wherein said cure promoter is N-methyl-N-(2-hydroxyethyl)-p-toluidine (MHPT).

61. The process of claim 43, wherein said curing step is conducted in the presence of at least one additional cure promoter.

62. The process of claim 61, wherein said at least one additional cure promoter comprises a tertiary aromatic amine cure promoter.

63. The process of claim 62, wherein said at least one additional cure promoter comprises a tertiary aromatic amine cure promoter selected from the group consisting of N,N-dimethylaniline (DMA), N,N-diethylaniline (DEA), N,N-dimethyl-p-toluidine (DMPT), and mixtures thereof.

64. The process of claim 63, wherein said at least one additional cure promoter comprises N,N-dimethyl-p-toluidine (DMPT).

65. The process of claim 61, wherein said at least one additional cure promoter comprises a metal salt.

* * * * *

UNITED STATES PATENT AND TRADEMARK OFFICE
CERTIFICATE OF CORRECTION

PATENT NO. : 6,774,193 B2
DATED : August 10, 2004
INVENTOR(S) : Santobianco et al.

It is certified that error appears in the above-identified patent and that said Letters Patent is hereby corrected as shown below:

<u>Column 24,</u>
Line 33, "(2-hydroxyethyl)" should read -- (2-hydroxypropyl) --.

Signed and Sealed this

Thirtieth Day of November, 2004

JON W. DUDAS
*Director of the United States Patent and Trademark Office*